United States Patent
Jakobsson (10) Patent No.: US 6,978,372 B1
(45) Date of Patent: Dec. 20, 2005

(54) VERIFICATION OF CORRECT EXPONENTIATION OR OTHER OPERATIONS IN CRYPTOGRAPHIC APPLICATIONS

(75) Inventor: Bjorn Markus Jakobsson, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/315,628

(22) Filed: May 20, 1999

(51) Int. Cl.$^7$ .............................. H04L 9/00; H04K 1/00
(52) U.S. Cl. ...................... 713/180; 713/181; 713/151; 380/30
(58) Field of Search ..................... 380/30; 713/180, 713/181, 201; 705/74

(56) References Cited

U.S. PATENT DOCUMENTS

| | | | | |
|---|---|---|---|---|
| 4,947,430 A | * | 8/1990 | Chaum | 713/180 |
| 5,373,558 A | * | 12/1994 | Chaum | 713/180 |
| 5,493,614 A | * | 2/1996 | Chaum | 380/30 |
| 6,154,841 A | * | 11/2000 | Oishi | 713/180 |
| 6,292,897 B1 | * | 9/2001 | Gennaro et al. | 713/175 |

OTHER PUBLICATIONS

Herzberg et al. "Proactive Public Key and Signature Systems", CCS 97, ACM.*
Jakobsson et al.. "Proving Without Knowing: On Oblivious, Agnostic and Blindfolded Provers".*
Menezes et al. Handbook of Applied Cryptography, 1997, pp. 474-480, §11.8.*
Michels et al. "Efficient Convertible Undeniable Signature Schemes (Extended Abstract)".*
Michels et al. "Breaking and repairing a convertible undeniable signature scheme", CCs '96, 1996, ACM.*
Patterson et al. Computer Architecture: A Quantitative Approach, Second Edition, published 1996, pp. 636-639.*
Bellare, Mihir et al. "Fast Batch Verification for Modular Exponentiation and Digital Signatures", Jun. 1998.*
Chaum, David et al. "Multiparty Computations Ensuring Privacy of Each Party's Input and Correctness of the Result".*
Gennaro, Rosario et al. "Simplified VSS and Fast-track Multiparty Computations with Applications to Threshold Cryptography", 1998.*

(Continued)

*Primary Examiner*—Gregory Morse
*Assistant Examiner*—Michael J Simitoski (57) ABSTRACT

The correctness of an exponentiation operation or other type of operation associated with a multi-party cryptographic protocol is verified using first and second proofs based on a randomized instance of the operation. A prover generates signals corresponding to information representative of the first and second proofs based on the randomized instance. The first proof is a so-called "blinded" proof that the operation has been correctly performed, configured so as to prevent leaks of information relating to the cryptographic protocol. The second proof is a proof that the first proof has been correctly performed by the prover. The proof information signals are transmitted from the prover to a verifier, and the verifier uses the signals to determine if the operation associated with the cryptographic protocol is valid. For example, the verifier in an illustrative embodiment generates an indication that the operation was correctly performed if the first and second proofs are acceptable to the verifier, generates an indication that the operation was not correctly performed if the first proof is not acceptable but the second proof is acceptable, and generates an indication of a cheating prover if the second proof is not acceptable. The verification protocol can be used in applications in which the prover is distributed across a number of different machines.

27 Claims, 4 Drawing Sheets

OTHER PUBLICATIONS

Jakobsson, Markus. "Efficient Oblivious Proofs of Correct Exponentiation", 1999.*

Wolfram, Stephen. "Mathematica: A System for Doing Mathematics by Computer, First Edition", 1998.*

Lyuu, Yuh-Dauh et al. "Group Undeniable Signatures", National Taiwan University, 2003.*

Lyuu, Yuh-Dauh et al. "Convertible Group Undeniable Signatures", National Taiwan University, 2003.*

D. Chaum, "Zero-Knowledge Undeniable Signatures," Advances in Cryptology-Proceedings of Euro-Crypt, pp. 458-464, 1990.

T.P. Pedersen, "Distributed Provers with Applications to Undeniable Signatures," Advances in Cryptology-Proceedings of EuroCrypt, pp. 221-242, 1991.

A. Fujioka et al., "Interactive Bi-Proof Systems and Undeniable Signature Techniques," Advances in Cryptology-Proceedings of EuroCrypt, pp. 243-256, 1991.

D. Chaum and H. Van Antwerpen, "Undeniable Signatures," Advances in Cryptology-Proceedings of Crypto '89, pp. 212-216.

M. Jakobsson and M. Yung, "Proving Without Knowing: On Oblivious, Agnostic and Blindfolded Provers," Crypto '96, pp. 186-200.

* cited by examiner

VERIFICATION OF CORRECT EXPONENTIATION OR OTHER OPERATIONS IN CRYPTOGRAPHIC APPLICATIONS

FIELD OF THE INVENTION

The invention relates generally to cryptographic techniques which may be implemented in computer networks or other types of electronic systems and devices, and more particularly to techniques for verifying correct exponentiation or other operations in such systems and devices.

BACKGROUND OF THE INVENTION

Exponentiation is a fundamental operation in many cryptographic applications, such as multi-party public key cryptography protocols. In such applications, there is often a need for the parties involved to prove to each other that the correct computation was performed, e.g., to prove that the intended exponentiation in relation to some public key was performed. However, in many multi-party protocols, whose robustness may depend on these types of proofs, it is not known beforehand whether the relation holds or not. Therefore, if the proof for proving a correct exponentiation requires that the computation indeed was correctly performed, then such a protocol may leak important information when given invalid inputs. This in turn may endanger protocol properties, such as privacy, as it potentially allows attacks on the protocol.

An example of a protocol which may leak information when given invalid inputs is based on the techniques described in D. Chaum and H. Van Antwerpen, "Undeniable Signatures," Advances in Cryptology-Proceedings of Crypto '89, pp. 212–216, which attempt to determine whether a given quadruple (g, y, m, s) satisfies the relation $\log_g y = \log_m s$ in the context of verifying the validity of undeniable signatures. These techniques have been extended in D. Chaum, "Zero-Knowledge Undeniable Signatures," Eurocrypt, '90, pp. 458–464, to a signature validity verification protocol which is zero-knowledge for valid inputs. However, it is assumed in this protocol that the prover knows whether the signature is valid or not. This is a serious deficiency of the protocol, since by running the zero-knowledge proof for an invalid input, the prover in fact leaks information regarding the corresponding valid signature. As a result, for invalid inputs, a standard distinguishing protocol, e.g., similar to a protocol suitable for proving graph non-isomorphism, must be used. T. P. Pedersen, "Distributed Provers with Applications to Undeniable Signatures," Advances in Cryptology-Proceedings of EuroCrypt '91, pp. 221–242, discloses how to distribute the zero-knowledge method for proving validity of undeniable signatures, but still under the above-noted problematic assumption that the prover already knows whether the input is a valid undeniable signature.

It is therefore desirable to design protocols that do not leak any information whether given valid or invalid inputs. Since the very aim of the protocol may be to determine whether the input is valid or not, the protocol should preferably comprise two sub-protocols, one for valid inputs and the other for invalid inputs, such that the behavior of a prover is identical for both sub-protocols. A protocol described in A. Fujioka et al., "Interactive Bi-Proof Systems and Undeniable Signature Techniques," Eurocrypt '91, pp. 243–256 is symmetric in the sense that it contains two identical portions for the prover, one for proving validity of undeniable signatures, the other for proving invalidity. It is not clear, however, how to distribute the protocol.

Such a protocol is referred to as "oblivious," since it does not require the protocol participants to know beforehand whether the input is of one type or another in order to correctly perform the computation. The term "oblivious" was coined by M. Jakobsson and M. Yung, "Proving Without Knowing: On Oblivious, Agnostic and Blindfolded Provers," Crypto '96, pp. 186–200, in proposing a multi-party protocol for determining whether a given exponentiation was correctly performed. Their protocol allows the distribution of the prover in a setting in which the prover cannot learn whether the input is valid or not. However, this protocol generally requires computation and communication operations that are logarithmic in the length of the security parameter, e.g., requires O(k) rounds and exponentiations in order to reduce the failure probability to $O(2^{-k})$, which may be a limiting consideration in certain applications.

SUMMARY OF THE INVENTION

The invention provides improved multi-party verification protocols which require significantly reduced computation and communication operations relative to the above-described conventional techniques. In an illustrative embodiment, the correctness of an exponentiation operation associated with a multi-party cryptographic protocol is verified using first and second proofs based on a randomized instance of the operation. A prover generates signals corresponding to information representative of the first and second proofs based on the randomized instance of the exponentiation operation. The first proof is a so-called "blinded" proof that the exponentiation operation has been correctly performed, configured so as to prevent leaks of information relating to the cryptographic protocol. The second proof is a proof that the first proof has been correctly performed by the prover, and is referred to herein as a "meta-proof." The proof information signals are transmitted from the prover to a verifier, and the verifier uses the signals to determine if the exponentiation operation associated with the cryptographic protocol is valid. For example, the verifier in an illustrative embodiment generates an indication that the operation was correctly performed if the first and second proofs are acceptable to the verifier, generates an indication that the operation was not correctly performed if the first proof is not acceptable but the second proof is acceptable, and generates an indication of a cheating prover if the second proof is not acceptable.

The verification protocol can be used in applications in which the prover is distributed across a number of different machines.

The verification protocols of the illustrative embodiments of the invention are correct, i.e., all the computations can be performed by the participants involved; sound, i.e., the decision made by the verifier corresponds to the true correctness with an overwhelming probability; and minimum-knowledge, i.e., the protocols leak no information, other than the desired verification result, and real protocol transcripts cannot be distinguished from simulated protocol transcripts by a polynomial-time distinguisher. Moreover, the protocols are "oblivious," i.e., the prover executes the same protocol for valid inputs as for invalid inputs.

In a non-distributed interactive version of the invention, the prover is given a quadruple (g, y, m, s), and needs to prove to the verifier that $\log_g y = \log_m s$. The prover knows the secret key x, i.e., the discrete logarithm of y with respect to g. This version of the verification protocol includes the following steps: the prover selecting a number a uniformly at random; the prover generating a first signal corresponding to information representative of the first proof as a triple $(\bar{s}, \bar{\sigma}, \bar{m})=(s^a, m^{ax}, m^a)$; the verifier accepting the first proof if and only if $\bar{s}=\bar{\sigma}$; the prover generating a second signal corresponding to information representative of the second proof as an indication that $\log_{\bar{m}} m = \log_{\bar{s}} s$ and that $\log_g y = \log_{\bar{m}} \bar{\sigma}$; the verifier accepting the second proof if and only if both equations are valid; and the verifier outputting an indication as to the validity of the exponentiation operation. A distributed version of this illustrative protocol may be generated from the non-distributed version in a straightforward manner.

In accordance with another aspect of the invention, a non-interactive version of the above-noted protocol may be implemented by the prover using the following steps: (i) applying a key transformation protocol which takes an input of the form (g, y, m, s), for which $\log_g y = \log_m s$, and produces a pair (G, Y) wherein G is a generator and Y is a public key, such that $X = \log_G Y$ can only be computed if $\log_g y = \log_m s$; and (ii) generating a digital signature using the pair (G, Y). The verifier then accepts the second proof as valid if and only if the corresponding digital signature is valid. In a related variant using a secret key transformation protocol, the key transformation protocol takes an input of the form (g, y, m, s, x) for which $\log_g y = \log_m s = x$ and generates the triple (G, Y, X) wherein X is a secret key, such that $Y = G^X$, and the digital signature is generated using the triple (G, Y, X). Again, distributed versions of these illustrative protocols may be generated from the corresponding non-distributed versions in a straightforward manner. It should also be noted that the key transformation techniques of the invention may be used independently of the verification protocols.

The present invention provides substantial advantages over conventional techniques. More particularly, the use of first and second proofs in the verification protocols of the invention significantly improves computation and communication efficiency relative to conventional protocols. In addition, the invention has applicability to many different types of existing multi-party protocols. For example, the invention can be applied to a wide variety of different types of cryptographic applications, such as key generation or escrow, message authentication, digital signatures, secure electronic commerce, etc.

DETAILED DESCRIPTION OF THE INVENTION

The present invention will be illustrated below in conjunction with an exemplary system in which cryptographic techniques are implemented over the Internet or other type of communication network. It should be understood, however, that the invention is more generally applicable to any type of electronic system or device application in which it is desirable to provide verification of correct exponentiation without one or more of the problems associated with conventional techniques. For example, although well-suited for use with communications over the Internet or other computer networks, the invention can also be applied to numerous other secure transaction applications, including applications based on smart cards or other electronic devices.

Figure 1:
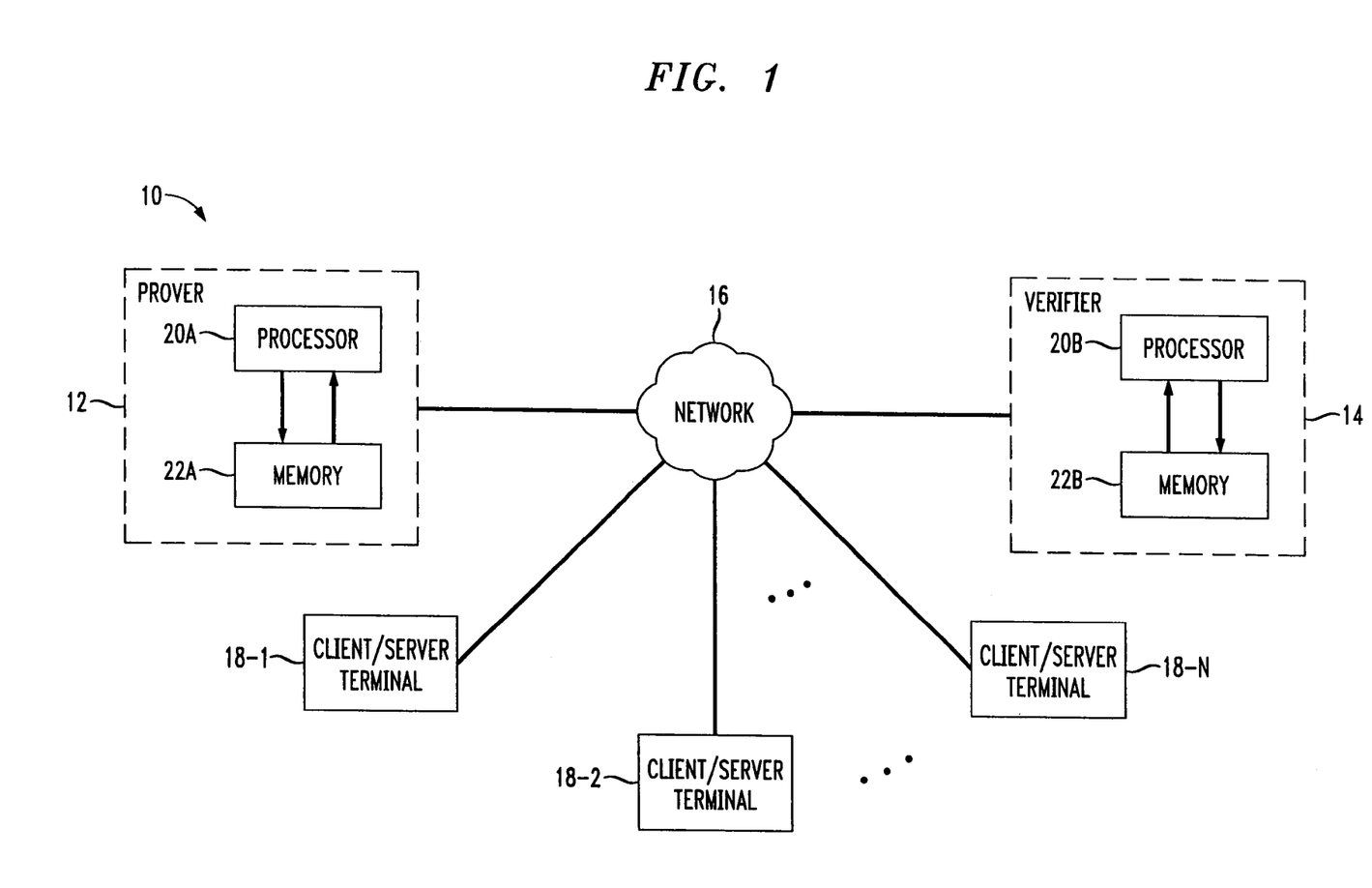
FIG. 1 shows an illustrative embodiment of a data processing system in which exponentiation verification in accordance with the invention may be utilized.
Figure 2:
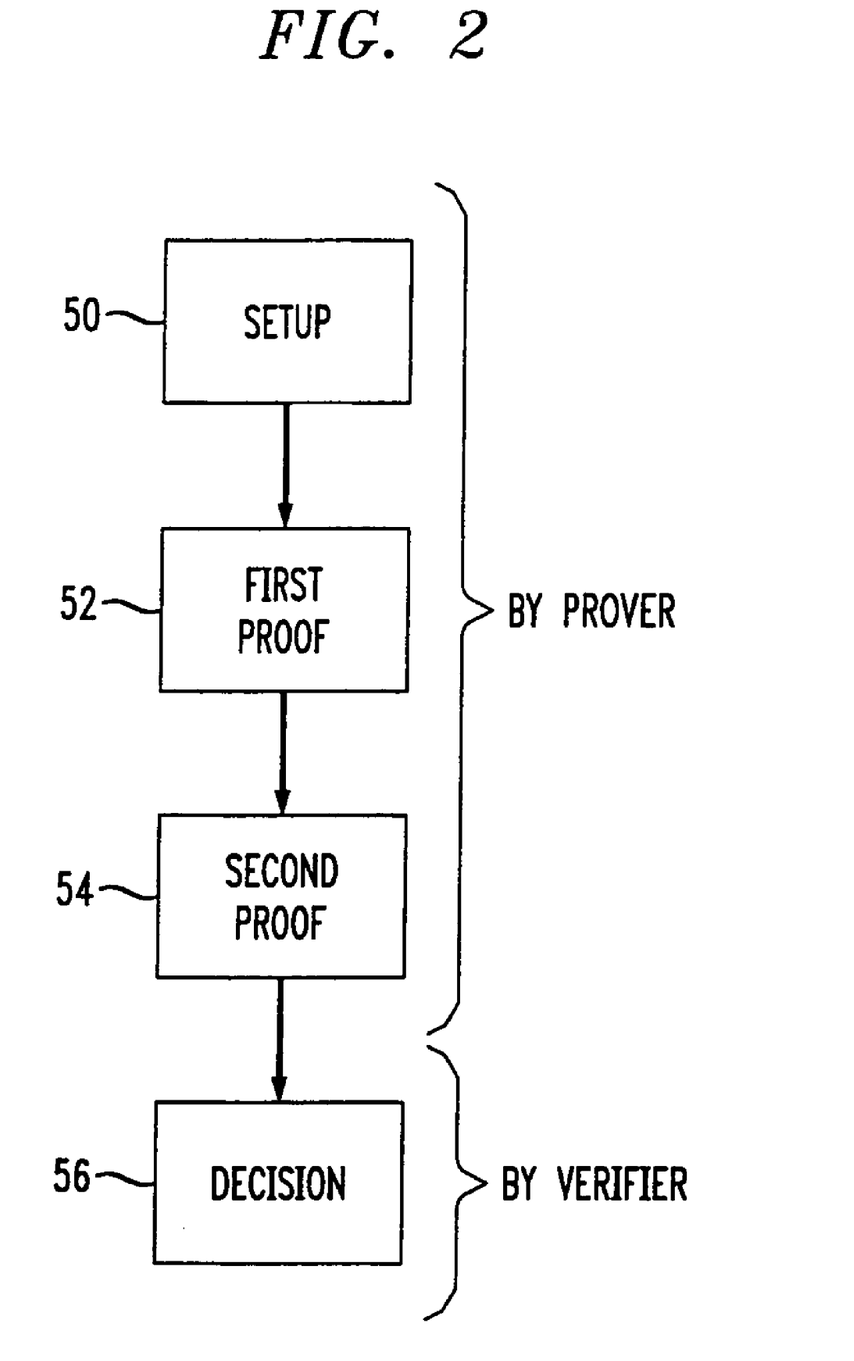
FIG. 2 is a flow diagram illustrating an exponentiation verification process of the invention.
Figure 3:
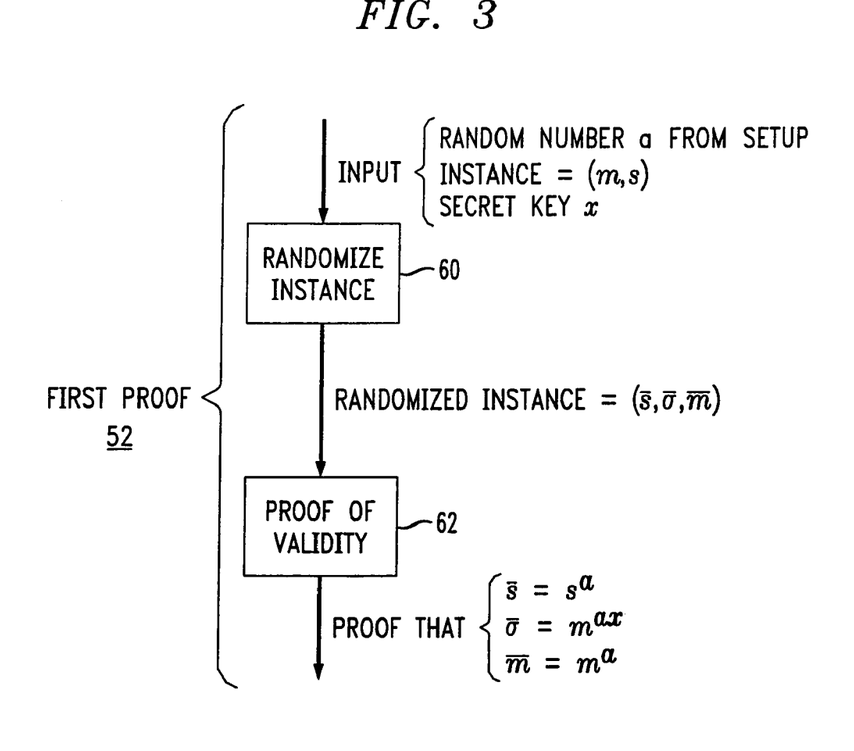
FIG. 3 is a flow diagram illustrating a first proof portion of the FIG. 2 process.

FIG. 1 shows an exemplary system 10 in which exponentiation verification techniques may be implemented in accordance with the invention. The system 10 includes a prover 12 and a verifier 14, both coupled to a network 16. Also coupled to the network 16 are a number of additional terminals 18-i, i=1, 2, . . . N, representing, e.g., additional client and/or server computers which communicate over the network 16. The prover 12 and verifier 14 include processors 20A, 20B coupled to memories 22A, 22B, respectively. One or more of the terminals 18-i may be configured in a manner similar to prover 12 and verifier 14.

One or more of the elements 12, 14 and 18-i of system 10 may thus be implemented as a personal computer, a mainframe computer, a computer workstation, a smart card in conjunction with a card reader, or any other type of digital data processor as well as various portions or combinations thereof. The processors 20A and 20B may each represent a microprocessor, a central processing unit, an application-specific integrated circuit (ASIC) or other suitable processing circuitry. The memories 22A and 22B may be electronic, magnetic or optical memories, as well as portions or combinations of these and other types of memories. The network 16 may be a local area network, a metropolitan area network, a wide area network, a global data communications network such as the Internet, a private "intranet" network or any other suitable data communication medium. The users 12, 14 execute software programs in accordance with the invention in order to provide secure transactions in a manner to be described in conjunction with FIGS. 2 through 5 below. The invention may be embodied in whole or in part in one or more software programs stored in one or more of the memories 22A, 22B, or in one or more programs stored on other computer-readable media associated with the users 12, 14 or the system 10.

The present invention provides a technique referred to as a "meta-proof" that can be used to verify correct exponentiation. A meta-proof in accordance with the invention generally comprises the following two portions: (a) a so-called "blinded" first proof which is a proof of the statement whose aim it is to prove or disprove, e.g., "the exponentiation was correctly performed," and (b) a second proof which is a proof that the first proof was correctly performed. The first proof is blinded to avoid leaks of information; the second proof is employed to maintain soundness in the presence of the blinding. If both proofs succeed, the verifier can conclude that the exponentiation was correctly performed. On the other hand, if the first proof fails and the second proof succeeds, this means that the exponentiation was not correctly performed. An oblivious and computationally zero-knowledge meta-proof for verification of valid exponentiation will be described in detail below in conjunction with FIGS. 2 through 5.

A first illustrative embodiment of the invention is interactive and based on standard protocols for verification of undeniable signatures. A second illustrative embodiment is non-interactive, and may be based on any discrete log based signature technique of a common format. The non-interactive embodiment is both a signature and a proof of equality of discrete logs, and is thus referred to as a discrete log equality (DLEQ) signature. The DLEQ signature of the present invention uses a transformation that takes a quadruple (g, y, m, s) as input, and generates the pair (G, Y) such that G is a generator and Y is a public key. A related transformation in accordance with the invention takes the quintuple (g, y, m, s, x) for which $\log_g y = \log_m s = X$ and generates the triple (G, Y, X), such that $Y = G^X$. Based on a random oracle assumption, it can be shown that it is only possible to determine the secret key X if $\log_g y = \log_m s$.

Using these new parameters, the prover can use any standard discrete log-based signature technique to convince the verifier that the relationship between the discrete logarithms holds. This is done simply by the prover generating a signature on some message using G as a generator, Y as a public key, and X as the corresponding secret key. This signature is given to the verifier. If the signature is valid, the verifier will conclude that $\log_g y = \log_m s$, since the prover with overwhelming probability must have known X. The method is demonstrated below using well-known Schnorr signatures, as described in, e.g., C. P. Schnorr, "Efficient Signature Generation for Smart Cards," Advances of Cryptology, Proceedings of Crypto '98, pp. 239–252, 1998. The input elements are applied to a generator and to public and secret keys that raise different factors of a product to different powers in order to "lock together" different input components. It can be shown that it is only possible to determine the secret key corresponding to these new aggregate components if the input components have the same discrete log relationship.

In the illustrative embodiments, it is assumed that a quadruple (g, y, m, s) is given to a set of participants that share the secret key x corresponding to the public key $y = g^x$. Unless otherwise stated, it is assumed for the following description that all computation is modulo p, where p is a large prime such that p=lq+1 for an integer 1 and another large prime q. It is the goal of these participants to determine whether or not $s = m^x$ holds. For simplicity of the protocol description it is also assumed that x is shared using a (k, n) threshold technique, as described in, e.g., A. Shamir, "How to Share a Secret," Communications of the ACM, Vol. 22, pp. 612–613, 1979.

A computational assumption made in the illustrative embodiments is that a random quadruple (g, $g^x$, m, $m^x$) cannot be distinguished from (g, $g^x$, m, R) for a random $R = m^r$, unless x is known. This assumption is known in the art as the "Decision Diffie-Hellman" assumption. A quadruple (g, y, m, s) is in the language of valid quadruples if $\log_g y = \log_m s$. This is with respect to a given pair of prime moduli (p, q) of the assumed format. The invention in the illustrative embodiments provides protocols for deciding language membership of given quadruples (g, y, m, s).

As will be described in greater detail below, the protocols of the illustrative embodiments of the invention are correct, i.e., all the computations can be performed by the participants involved; sound, i.e., the decision made corresponds to the true language membership with an overwhelming probability; and minimum-knowledge, i.e., the protocols leak no information, other than the desired one bit result, and real protocol transcripts cannot be distinguished from simulated protocol transcripts by a polynomial-time distinguisher. Moreover, the protocols are "oblivious," i.e., the prover executes the same protocol for input quadruples in the language as for those that are not. In other words, the prover executes the same protocol for valid inputs as for invalid inputs.

The invention will first be described in a non-distributed version for simplicity of notation. It will be apparent to those skilled in the art that this is a setting in which oblivious protocols are not needed for security reasons, since the prover can decide whether to use the protocol for language membership or non-membership before the start of the protocol. However, it will also be shown below that the non-distributed version of the protocol can be easily converted to a distributed version. In the non-distributed version of the protocol, the prover is given a quadruple (g, y, m, s), and needs to determine, and prove, whether $\log_g y = \log_m s$. It is assumed that the prover knows the secret key x, i.e., the discrete logarithm of y with respect to g.

The flow diagrams in FIGS. 2 through 5 illustrate this version of the protocol. Steps 50, 52, 54 and 56 correspond to setup, first proof, second proof and decision portions, respectively, of the protocol. Steps 50, 52, and 54 are carried out by the prover, e.g., prover 12 of FIG. 1, and step 56 by the verifier, e.g., verifier 14 of FIG. 1. Step 52 is shown in greater detail in FIG. 3 and includes steps 60 and 62. Step 54 is shown in greater detail in FIG. 4. Step 56 is shown in greater detail in FIG. 5 and includes steps 70 and 72.

Figure 4:
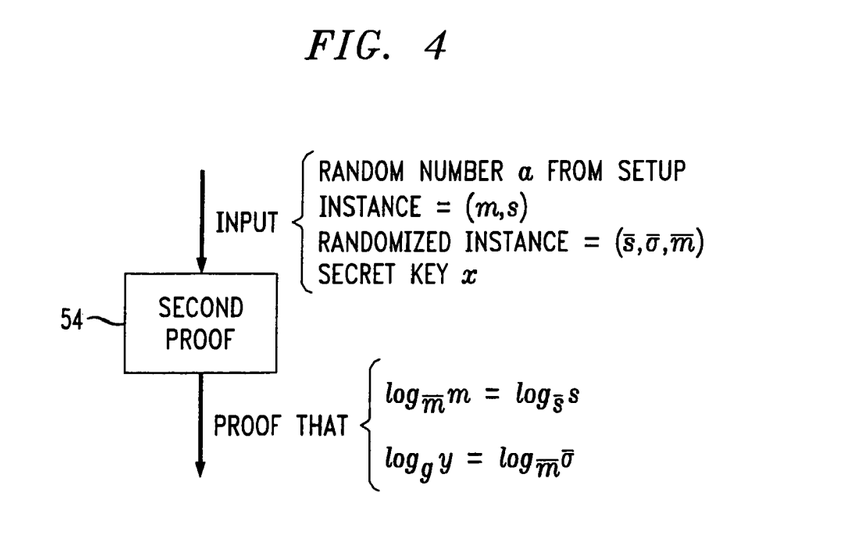
FIG. 4 is a flow diagram illustrating a second proof portion of the FIG. 2 process.
Figure 5:
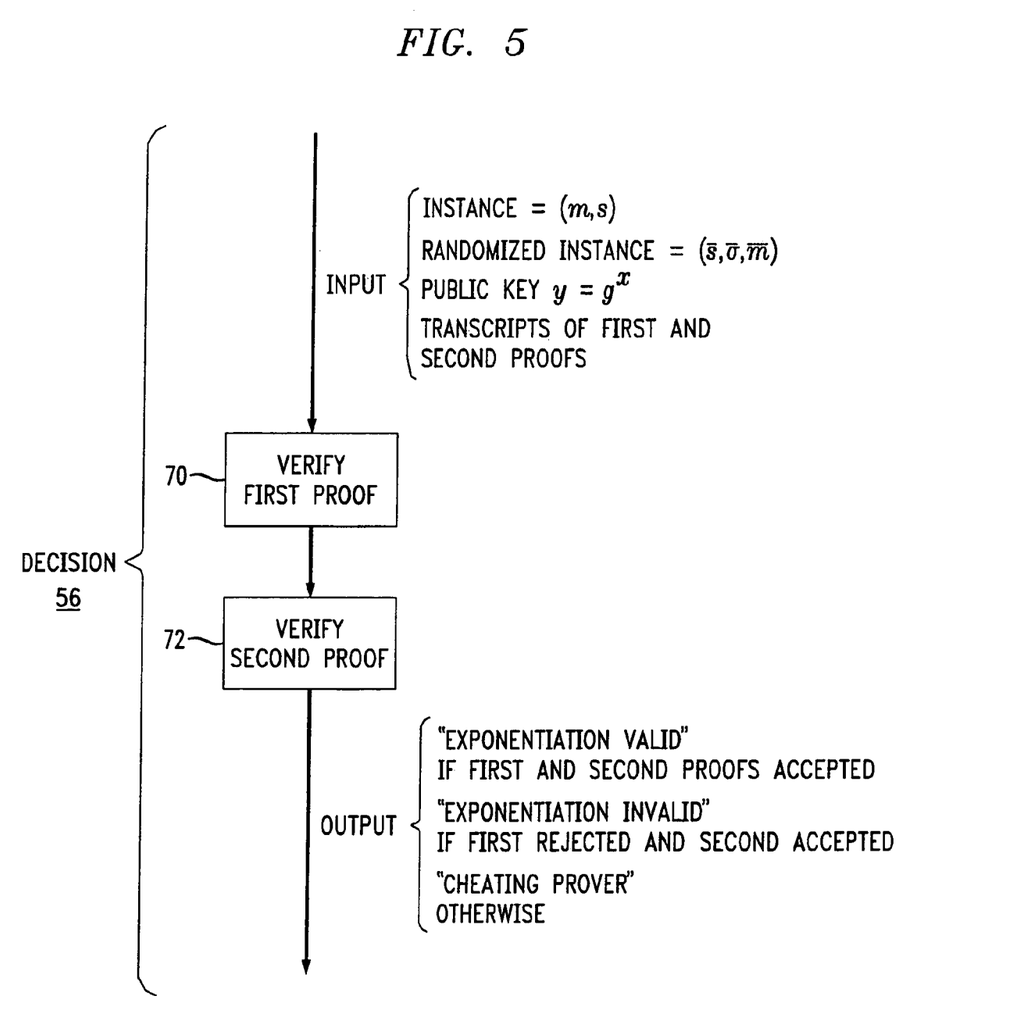
FIG. 5 is a flow diagram illustrating a decision portion of the FIG. 2 process.

The non-distributed version of the protocol is as follows:
1. Setup (Step 50). The prover selects a number $a \in_u Z_q$ uniformly at random.
2. First proof (Step 52). The prover in step 60 of FIG. 3 generates a randomized instance from the random number a, an instance (m, s) and the secret key x. In step 62, the prover generates and outputs information corresponding to a first proof, namely the triple $(\bar{s}, \bar{\sigma}, \bar{m}) = (s^a, m^{ax}, m^a)$. In step 70 of FIG. 5, the verifier accepts this first proof if and only if $\bar{s} = \bar{\sigma}$.
3. Second proof (Step 54). The prover, using the randomized instance, proves that $\log_{\bar{m}} m = \log_{\bar{s}}$ and that $\log_g y = \log_{\bar{m}} \bar{\sigma}$, as indicated in FIG. 4. In step 72 of FIG. 5, the verifier accepts this second proof if and only if both equations are found to hold.
4. Decision (Step 56). The decision portion of the process includes steps 70 and 72 as previously described. As shown in FIG. 5, the verifier outputs "exponentiation valid" if it accepted both the first and second proofs. The verifier outputs "exponentiation invalid" if it rejected the first proof and accepted the second proof. Otherwise, it outputs "cheating prover."

Interactive versions of the above protocol can utilize, e.g., a proof protocol for undeniable signatures to prove equality of discrete logs, as described in the above-cited D. Chaum references. Moreover, a simple and efficient non-interactive protocol can also be constructed, using any common discrete-log based protocol.

The non-interactive proof protocol for performing the proofs of equality of discrete logs needed in the previous protocol will now be described. This non-interactive proof protocol is described in two steps. First, a key transformation protocol is described. The key transformation protocol takes an input of the form (g, y, m, s), for which $\log_g y = \log_m s$, and produces a pair (G, Y), such that $X = \log_G Y$ can only be computed if $\log_g y = \log_m s$, and this discrete log is known. Second, it is shown how these new parameters can be used in standard signature techniques of a common format, e.g., Schnorr signatures. Here, the DLEQ proof is said to succeed if and only if the corresponding signature is valid. Again, the non-distributed version of the protocol is considered in order to simplify the notation, and the modifications needed to obtain the distributed version are straightforward and will be apparent to those of ordinary skill in the art.

In a public key transformation implementation of the DLEQ signature technique of the invention, the transformation algorithm takes as input the quadruple (g, y, m, s). Two randomizing coefficients are computed. These are $e_j$=hash (g, y, m, s, j), for j∈{1, 2}, where hash is an arbitrary hash function that can be modeled by, e.g., a random oracle. The transformation then pairwise "locks together" the components of the input in the following manner: $G=g^{e_1}m^{e_2}$, and $Y=y^{e_1}s^{e_2}$. The transformation algorithm outputs the pair (G, Y), where G is denoted the new generator and Y is denoted the new public key.

A similar transformation implementation of the DLEQ signature technique of the invention may be used for secret keys. This is much more straightforward, however, as it simply involves setting the output secret key X to the input secret key x, or X=x. The transformation in this case outputs the triplet (G, Y, X), where G is the new generator, Y is the new public key, and X is the new secret key. This new generator, public key and secret key can be used in a standard signature technique. For example, standard Schnorr signatures can be generated as follows. The prover selects a value $k \in Z_q$ uniformly at random. It computes $r=g^k$, and the value t=k−c x mod q, where c=hash ($\mu$, r), for a message $\mu$ to be signed, and x is the secret key of the signer, with a corresponding public key $y=g^x$. The prover outputs (r, t) as a signature on m. The signature is verified by checking that $r=y^c g^t$ for c=hash ($\mu$, r). This Schnorr signature technique can be directly used to prove the equality of discrete logarithms by using (G, Y, X) instead of (g, y, x). The message $\mu$ is irrelevant in this setting. Similarly, any other signature technique with this general structure may be employed.

The above-described oblivious protocol for verifying correct exponentiation is computational minimum-knowledge, i.e., given a bit corresponding to the desired output of the verifier "exponentiation valid" or "exponentiation invalid," there is a simulator whose transcripts cannot be distinguished by a polynomial-time verifier from those generated by a real prover. In other words, given an oracle for language membership, it is possible in polynomial-time to simulate transcripts that cannot be distinguished with a non-negligible probability by any polynomial-time participant from real protocol transcripts for the corresponding proof.

The oblivious protocol is correct, i.e., all computation can be performed by the participants, and the expected output is produced if all the participants are honest.

The oblivious protocol is sound, i.e., it is infeasible for a dishonest prover to make the verifier output "exponentiation valid" for an input quadruple not in the language, or "exponentiation invalid" for an input quadruple in the language. In other words, if the verifier outputs "exponentiation valid," then the exponentiation must be valid with an overwhelming probability; likewise, if he outputs "exponentiation invalid," the exponentiation must be invalid with an overwhelming probability. This holds since the second-order proof, whose soundness can be demonstrated, prevents the prover from cheating in the first-order proof.

The DLEQ signature protocol is correct, i.e., when used in conjunction with a sound and correct signature technique, the resulting signature will be valid with an overwhelming probability if the input (g, y, m, s) to the key transformation protocol is such that $\log_g y = \log_m s$. In other words, if the generated keys are used in a signature technique in the manner shown, then the signature proof succeeds if the input parameters to the transformation protocol have the same pairwise discrete log relation.

The transformation protocol is sound, i.e., when used in conjunction with a sound and correct signature technique, the resulting signature will be valid only if the input (g, y, m, s) to the transformation protocol is such that $\log_g y = \log_m s$. In other words, the verifier of the signature protocol in which the generated keys are used will reject the signature with an overwhelming probability if the input parameters to the transformation protocol do not have the pairwise discrete log relation.

A distributed version of the above-described exponentiation verification protocol will now be described. In the distributed version, the prover is distributed across multiple machines, e.g., across the set of terminals 18−i of system 10. In other embodiments, the prover 12 could be one of the terminals comprising a portion of a distributed prover. The distributed version is illustrated using the above-noted Schnorr-based signature technique for proof of equality of discrete logarithms, although other embodiments of the invention are similarly straightforward to implement with a distributed prover. For simplicity of notation, $x_{Qi}$ denotes server i's Lagrange-weighted share (when applicable) of the secret key x, given an active quorum Q. For the part of the proof that uses the blinding factor a as a secret and distributed key, $a_i$ plays the role of $x_{Qi}$. The same uniform notation as previously introduced is used in the following illustrative distributed version, i.e., the prover wishes to prove that $\log_g y = \log_m s$ for an input quadruple (g, y, m, s), where $x = \log_g y$.

1. Server i computes $e_j$=hash (g, y, m, s, j), for j∈{1, 2}. Server i then computes $G=g^{e_1}y^{e_2}, Y=y^{e_1}s^{e_2}$.

2. Server i selects $k_i \in_u Z_q$, and computes $r_i = G^{k_i}$. Server i commits to this, and decommits first after all the other servers have committed. All commitments are verified, and $r = \Pi_{i \in Q} r_i$ is computed. Finally, server i computes $t_i = k_i − cx_i$, for c=hash(r). The value $t_i$ is published, and each server computes $t = \Sigma_{i \in Q} t_i$ mod q.

3. The servers verify that $Y^c G^t = r$, after which the pair (r, t) is output.

If a cheating prover is detected at any time, then the protocol is stopped, the corresponding server is replaced, and the computation is restarted from the beginning.

It should be understood that the above-described embodiments of the invention are illustrative only. For example, the invention can be applied to any type of digital signature protocol and to numerous other cryptographic applications involving exponentiation. These and numerous other alternative embodiments within the scope of the following claims will be apparent to those skilled in the art.

What is claimed is:

1. A method of implementing a cryptographic protocol between multiple parties including at least a prover and a verifier, the method being implemented in a digital data processor including a processor and a memory, and the method comprising the steps of:

generating at least one signal corresponding to information representative of first and second proofs performed by the prover based on an operation associated with the cryptographic protocol, wherein the first proof is a proof that the operation has been correctly performed, and the second proof is a proof that the first proof has been correctly performed; and transmitting the proof information signal from the prover to the verifier, such that the verifier can determine if the operation associated with the cryptographic protocol is valid based at least in part on the proof information signal.

2. The method of claim 1 wherein the operation associated with the cryptographic protocol is an exponentiation operation, and the proof information signal is based on a randomized instance of the exponentiation operation.

3. The method of claim 1 wherein the first proof is a blinded proof configured so as to prevent leaks of information relating to the cryptographic protocol.

4. The method of claim 1 further including the step of generating an indication that the operation was correctly performed if the first and second proofs are acceptable to the verifier.

5. The method of claim 1 further including the step of generating an indication that the operation was not correctly performed if the first proof is not acceptable to the verifier but the second proof is acceptable to the verifier.

6. The method of claim 1 wherein further including the step of generating an indication that the prover is cheating if the second proof is not acceptable to the verifier.

7. The method of claim 1 wherein the prover is given a quadruple (g, y, m, s), and needs to prove to the verifier that $\log_g y = \log_m s$, the prover knows x, the discrete logarithm of y with respect to g, and the method further includes the steps of:
   the prover randomly selecting a number a;
   the prover generating a first signal corresponding to information representative of the first proof as a triple $(\bar{s}, \bar{\sigma}, \bar{m}) = (s^a, m^{ax}, m^a)$;
   the verifier accepting the first proof if and only if $\bar{s} = \bar{\sigma}$;
   the prover generating a second signal corresponding to information representative of the second proof as an indication that $\log_{\bar{m}} m = \log_{\bar{s}} s$ and that $\log_g y = \log_{\bar{m}} \bar{\sigma}$
   the verifier accepting the second proof if and only if both equations are valid; and
   the verifier outputting at least one of: (i) an indication of valid exponentiation if both the first and second proofs are accepted; (ii) an indication that the exponentiation is invalid if the first proof is rejected and the second proof is accepted; and (iii) an indication that the prover is cheating if the second proof is rejected.

8. The method of claim 1 further including the steps of:
   applying a key transformation protocol which takes an input of the form (g, y, m, s), for which $\log_g y = \log_m s$, and produces a pair (G, Y) wherein G is a generator and Y is a public key, such that $X = \log_G Y$ can only be computed if $\log_g y = \log_m s$;
   generating a signal corresponding to information representative of the second proof as a digital signature generated using the pair (G, Y); and
   accepting the second proof if and only if the corresponding digital signature is valid.

9. The method of claim 8 wherein the key transformation protocol takes an input of the form (g, y, m, s, x) for which $\log_g y = \log_m s = x$ and generates the triple (G, Y, X) wherein X is a secret key, such that $Y = G^x$, and the digital signature is generated using the triple (G, Y, X).

10. The method of claim 1 wherein the prover is a distributed prover distributed over multiple machines.

11. An apparatus for implementing a cryptographic protocol between multiple parties including at least a prover and a verifier, the apparatus comprising:
   a processor associated with the prover and operative to generate at least one signal corresponding to information representative of first and second proofs performed by the prover based on an operation associated with the cryptographic protocol, wherein the first proof is a proof that the operation has been correctly performed, and the second proof is a proof that the first proof has been correctly performed, wherein the proof information signal is transmitted from the prover to the verifier and used to determine if the operation associated with the cryptographic protocol is valid; and
   a memory coupled to the processor for at least temporarily storing at least a portion of the proof information signal.

12. The apparatus of claim 11 wherein the operation associated with the cryptographic protocol is an exponentiation operation, and the proof information signal is based on a randomized instance of the exponentiation operation.

13. The apparatus of claim 11 wherein the first proof is a blinded proof configured so as to prevent leaks of information relating to the cryptographic protocol.

14. The apparatus of claim 11 wherein the verifier is operative to generate an indication that the operation was correctly performed if the first and second proofs are acceptable to the verifier.

15. The apparatus of claim 11 wherein the verifier is operative to generate an indication that the operation was not correctly performed if the first proof is not acceptable to the verifier but the second proof is acceptable to the verifier.

16. The apparatus of claim 11 wherein the verifier is operative to generate an indication that the prover is cheating if the second proof is not acceptable to the verifier.

17. The apparatus of claim 11 wherein the prover is given a quadruple (g, y, m, s), and needs to prove to the verifier that $\log_g y = \log_m s$, the prover knows x, the discrete logarithm of y with respect to g, and the prover and the verifier being configured to operate as follows:
   the prover randomly selecting a number a;
   the prover generating a first signal corresponding to information representative of the first proof as a triple $(\bar{s}, \bar{\sigma}, \bar{m}) = (s^a, m^{ax}, m^a)$;
   the verifier accepting the first proof if and only if $\bar{s} = \bar{\sigma}$;
   the prover generating a second signal corresponding to information representative of the second proof as an indication that $\log_{\bar{m}} m = \log_{\bar{s}} s$ and that $\log_g y = \log_{\bar{m}} \bar{\sigma}$
   the verifier accepting the second proof if and only if both equations are valid; and
   the verifier outputting at least one of: (i) an indication of valid exponentiation if both the first and second proofs are accepted; (ii) an indication that the exponentiation is invalid if the first proof is rejected and the second proof is accepted; and (iii) an indication that the prover is cheating if the first proof is accepted and the second proof is rejected.

18. The apparatus of claim 11 wherein the processor is further operative:
   to apply a key transformation protocol which takes an input of the form (g, y, m, s), for which $\log_g y = \log_m s$, and produces a pair (G, Y) wherein G is a generator and Y is a public key, such that $X = \log_G Y$ can only be computed if $\log_g Y = \log_m s$; and to generate a signal corresponding to information representative of the second proof as a digital signature generated using the pair (G, Y); such that the verifier accepts the second proof if and only if the corresponding digital signature is valid.

19. The apparatus of claim 18 wherein the key transformation protocol takes an input of the form (g, y, m, s, x) for which $\log_g y = \log_m s = x$ and generates the triple (G, Y, X) wherein X is a secret key, such that $Y = G^x$, and the digital signature is generated using the triple (G, Y, X).

20. The apparatus of claim 11 wherein the prover is a distributed prover distributed over multiple machines, and wherein one of the machines includes the processor.

21. The apparatus of claim 11 wherein the prover is a distributed prover distributed over multiple machines, and wherein the processor comprises a distributed processor including at least a portion of a processor associated with each of at least a subset of the multiple machines.

22. A computer-readable medium containing one or more programs for implementing a cryptographic protocol between multiple parties comprising a prover and a verifier, wherein the one or more programs when executed in a computer provide the steps of:
   generating at least one signal corresponding to information representative of first and second proofs performed by the prover based on an operation associated with the cryptographic protocol, wherein the first proof is a proof that the operation has been correctly performed, and the second proof is a proof that the first proof has been correctly performed; and
   transmitting the proof information signal from the prover to the verifier, such that the verifier can determine if the operation associated with the cryptographic protocol is valid based at least in part on the proof information signal;
   a result of the determination by the verifier being utilizable in implementing the cryptographic protocol.

23. A method for implementing a cryptographic protocol between multiple parties including at least a prover and a verifier, the method being implemented in a digital data processor including a processor and a memory and the method comprising the steps of:
   applying a key transformation protocol which takes an input of the form (g, y, m, s), for which $\log_g y = \log_m s$, and produces a pair (G, Y) wherein G is a generator and Y is a public key, such that $X = \log_G Y$ can only be computed if $\log_g y = \log_m s$; and
   generating a digital signature using the pair (G, Y).

24. An apparatus for implementing a cryptographic protocol between multiple parties including at least a prover and a verifier, the apparatus comprising:
   a processor associated with the prover and operative: (i) to apply a key transformation protocol which takes an input of the form (g, y, m, s), for which $\log_g y = \log_m s$, so as to produce a pair (G, y) wherein G is a generator and Y is a public key, such that $X = \log_G Y$ can only be computed if $\log_g y = \log_m s$; and (ii) to generate a digital signature using the pair (G, Y).

25. A method of implementing a cryptographic protocol between multiple parties including at least a prover and a verifier, the method being implemented in a digital data processor including a processor and a memory and the method comprising the steps of:
   receiving at least one signal corresponding to information representative of first and second proofs performed by the prover based on an operation associated with the cryptographic protocol, wherein the first proof is a proof that the operation has been correctly performed, and the second proof is a proof that the first proof has been correctly performed; and
   determining if the operation associated with the cryptographic protocol is valid based at least in part on the proof information signal.

26. An apparatus for implementing a cryptographic protocol between multiple parties including at least a prover and a verifier, the apparatus comprising:
   a processor associated with the verifier and operative: (i) to receive at least one signal corresponding to information from the prover representative of first and second proofs performed by the prover based on an operation associated with the cryptographic protocol, wherein the first proof is a proof that the operation has been correctly performed, and the second proof is a proof that the first proof has been correctly performed, and (ii) to determine if the operation associated with the cryptographic protocol is valid based at least in part on the proof information signal; and
   a memory coupled to the processor for at least temporarily storing at least a portion of the proof information signal.

27. A computer-readable medium containing one or more programs for implementing a cryptographic protocol between multiple parties comprising a prover and a verifier, wherein the one or more programs when executed in a computer provide the steps of:
   receiving at least one signal corresponding to information representative of first and second proofs performed by the prover based on an operation associated with the cryptographic protocol, wherein the first proof is a proof that the operation has been correctly performed, and the second proof is a proof that the first proof has been correctly performed; and
   determining if the operation associated with the cryptographic protocol is valid based at least in part on the proof information signal;
   a result of the determination by the verifier being utilizable in implementing the cryptographic protocol.

* * * * *

UNITED STATES PATENT AND TRADEMARK OFFICE
CERTIFICATE OF CORRECTION

PATENT NO. : 6,978,372 B1
DATED : December 20, 2005
INVENTOR(S) : B.M. Jakobsson It is certified that error appears in the above-identified patent and that said Letters Patent is hereby corrected as shown below:

Column 9,
Line 21, in the equation, change "y=log" from subscript to regular style.
Line 31, insert -- ; -- at the end of the line.
Line 54, delete "x" and insert -- X --.

Column 10,
Line 38, insert -- ; -- at the end of the line.
Line 54, in the equation, delete "Y" and insert -- y --.

Column 11,
Line 28, insert -- , -- after "memory".

Signed and Sealed this

Fourteenth Day of March, 2006

JON W. DUDAS
*Director of the United States Patent and Trademark Office*